June 4, 1963
A. KUSKO
3,092,768
REGULATOR
Filed Oct. 9, 1957
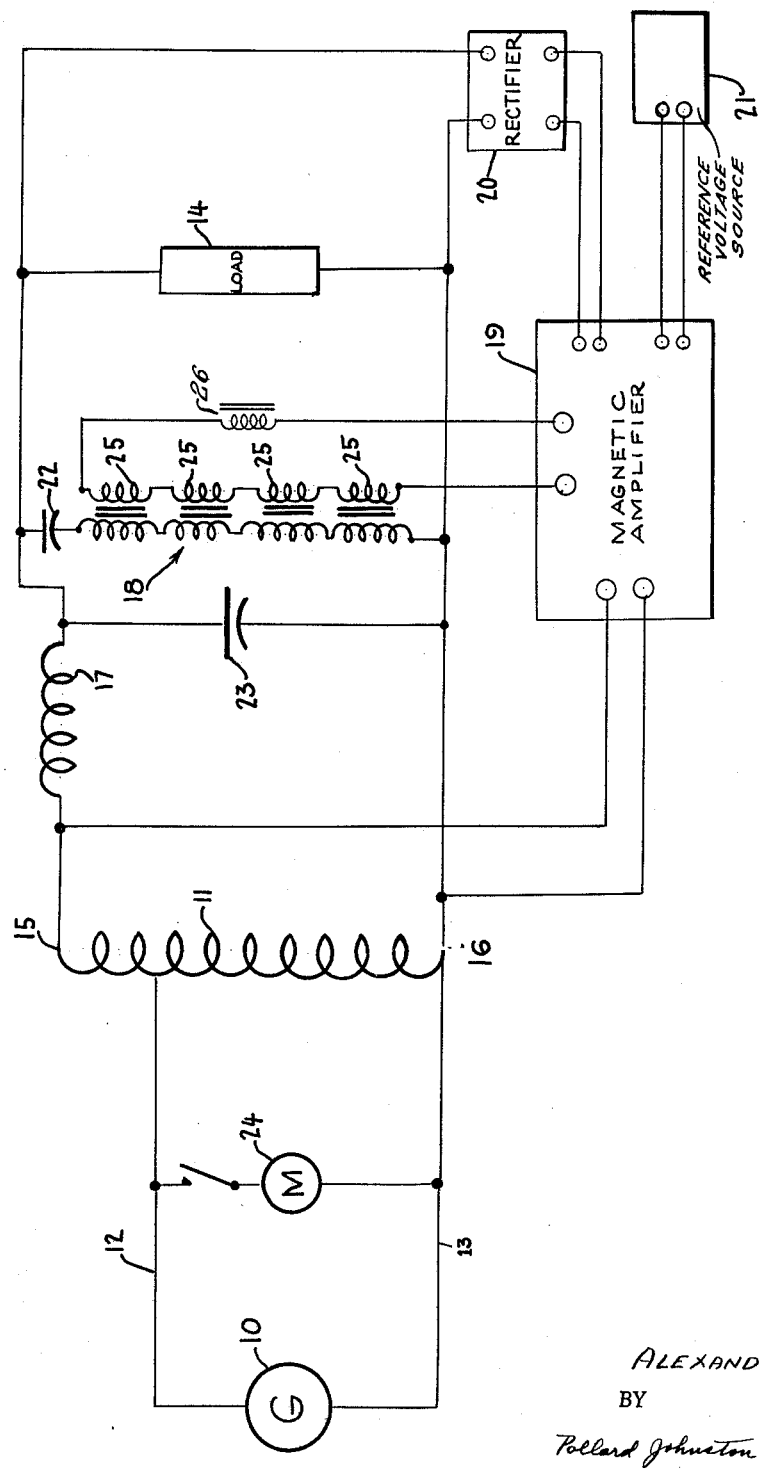
INVENTOR.
ALEXANDER KUSKO
BY
Pollard Johnston Smythe & Robertson
ATTORNEYS United States Patent Office 3,092,768
Patented June 4, 1963

3,092,768
REGULATOR
Alexander Kusko, Newton Center, Mass., assignor, by mesne assignments, to Basic Products Corporation, Milwaukee, Wis., a corporation of Wisconsin
Filed Oct. 9, 1957, Ser. No. 689,217
4 Claims. (Cl. 323—66)

This invention relates to a voltage regulator and particularly to one using a poly-unit saturable reactor.

One of the problems in a voltage regulator feeding a system having critical elements is to prevent undesirable voltage transients when additional load is suddenly applied to or removed from the power line or the terminals of an isolated generator which supplies the line voltage regulator supplying the load. As an example, a system supplying radar equipment must be arranged so that there will be no disturbance caused as the additional load is connected to the generator.

One of the objects of the invention is to provide an arrangement wherein load voltage can be maintained substantially constant regardless of sudden application of loads to the generator.

Another of the objects of the invention is to provide an arrangement producing a load voltage free from harmonics.

In one aspect of the invention, a load means can be connected to a source of A.C. such as an isolated generator, the load being connected through an impedance in series therewith. A poly-unit saturable reactor such as described in copending application Serial Number 536,156, filed September 23, 1957, now Patent No. 2,916,689, issued December 8, 1959, can be connected in shunt across the load. Such a poly-unit reactor has a plurality of magnetic cores, preferably at least three, load windings and associated control windings. A sensing and signal comparing means is connected across the load to provide a voltage signal for energizing the control windings of the saturable reactor. The sensing and comparing means is arranged so as to apply D.C. control power to the control windings so that the control power is varied in the same direction as variation in load voltage from a predetermined or reference value. In one form, for example, the sensing and comparing means may be a magnetic amplifier responsive to a rectified voltage received from across the load, the output of the amplifier being controlled from the load voltage signal and a reference voltage. The poly-unit saturable reactor will vary the current flowing through the series impedance and therefore the voltage drop across said impedance. For example, if the voltage across the load is reduced, the sensing and comparing means will cause less current to flow through the shunt reactor and there will be a smaller voltage drop across the series impedance which in turn will cause a greater voltage to appear across the load. The current of the poly-unit saturable reactor will have a wave shape which is approximately sinusoidal as compared with the distorted current wave shapes of conventional saturable reactors. Also, the poly-unit saturable reactor will have a transient response which is much faster than conventional saturable reactors.

In a preferred form, the generator can be connected to the system through an autotransformer or suitable arrangement so as to compensate for voltage drop through the series impedance. A series capacitor can be used in the poly-unit saturable reactor shunt branch to improve the transient behavior of the poly-unit saturable reactor. A capacitor also can be connected in shunt across the load so as to provide power factor correction. The arrangement can be used for single phase or polyphase systems, and it also can be used to sense and control current as well as voltage.

These and other objects, advantages and features will become apparent from the following description and drawing which are merely exemplary.

In the drawing:

The single FIGURE is one form of circuit.

Referring to the figure generator 10 is connected to autotransformer 11 through lines 12, 13. Load 14 is connected to the output terminals 15, 16 of autotransformer 11 through a series impedance 17, the series impedance in the embodiment illustrated being an inductor or reactor. Poly-unit saturable reactor 18 is connected in shunt across load 14.

In the form shown, four magnetic cores with control windings and load windings are employed. As described in the aforementioned Patent No. 2,916,689, preferably three or more magnetic cores and windings are used and the turns ratios chosen so that a substantially sinusoidal current wave shape is obtained.

The sensing and comparing means may take various forms, one being a magnetic amplifier schematically shown at 19. A voltage signal is fed to said amplifier from across load 14 by rectifier 20. A reference voltage 21 is fed to said amplifier and the amplifier receives an A.C. input from across terminals 15, 16 of the autotransformer. Capacitor 22 is connected in the poly-unit shunt circuit for the purpose of improving the transient behavior against line voltage transients, it being selected so that it will substantially cancel out the initial part of these transients. Shunt capacitor 23 is connected in shunt across the poly-unit saturable reactor so as to improve power factor and to provide a filtering path for residual or high order harmonics in the saturable reactor to prevent the same passing through the load. A second load is schematically shown at 24. Reactor 26 in the control circuit of the poly-unit saturable reactor is required to insure that the waveform of the A.C. current is substantially sinusoidal.

The voltage signal fed from rectifier 20 to the magnetic amplifier 19 will produce a control signal or control power through the control windings 25 of the poly-unit saturable reactor 18, reference source 21 being adjusted as needed. If, for example, load 24 is suddenly applied across generator 10, the voltage applied to the autotransformer 11 will be reduced. This will result in a reduction in the voltage across load 14 and consequent reduction in the voltage signal applied to amplifier 19.

The control power fed to the control windings will be reduced so that less current will flow through shunt poly-unit saturable reactor 18 and thereby less current through series reactor 17. As a result, there will be less voltage drop across reactor 17 and a corresponding increase in the voltage across load 14.

It should be apparent that variations may be made in the arrangement without departing from the spirit of the invention except as defined in the appended claims.

What is claimed is:

1. In a line voltage regulator; the combination including an electrical load means; a source of A.C. connected to said load means; reactor means connected in series with said load means and source; means for limiting voltage variations across said load means comprising poly-unit saturable reactor means having at least three saturable magnetic cores and at least three load windings connected in series in a phase and in shunt with said load means, each of said reactors having its load turns and core area related to the load turns and core area of the others so that twice during each cycle of A.C., each reactor unit will desaturate in a predetermined manner so as to provide a sinusoidal current wave form; and capacitor means connected across said poly-unit means.

2. In a line voltage regulator; the combination including an electrical load means; a source of A.C. connected to said load means; reactor means connected in series with said load means and source; means for limiting voltage variations across said load means comprising poly-unit saturable reactor means having at least three saturable magnetic cores and at least three load windings connected in series in a phase and in shunt with said load means, each of said reactors having its load turns and core area related to the load turns and core area of the others so that twice during each cycle of A.C., each reactor unit will desaturate in a predetermined manner so as to provide a sinusoidal current wave form; capacitor means connected across said poly-unit means; and capacitor means connected in series with said poly-unit saturable reactor means.

3. In a line voltage regulator; the combination including an electrical load means; a source of A.C. connected to said load means; reactor means connected in series with said load means and source; means for limiting voltage variations across said load means comprising poly-unit saturable reactor means having control winding means and at least three saturable magnetic cores and at least three load windings connected in series in a phase and in shunt with said load means, each of said reactors having its load turns and core area related to the load turns and core area of the others so that twice during each cycle of A.C., each reactor unit will desaturate in a predetermined manner so as to provide a sinusoidal current wave form; capacitor means connected across said poly-unit means; voltage responsive means connected across said load means providing a signal; and sensing and comparing means responsive to said signal for applying D.C. control power to said control windings.

4. In a line voltage regulator; the combination including an electrical load means; a source of A.C. connected to said load means; reactor means connected in series with said load means and source; means for limiting voltage variations across said load means comprising poly-unit saturable reactor means having control winding means and at least three saturable magnetic cores and at least three load windings connected in series in a phase and in shunt with said load means, each of said reactors having its load turns and core area related to the load turns and core area of the others so that twice during each cycle of A.C., each reactor unit will desaturate in a predetermined manner so as to provide a sinusoidal current wave form; capacitor means connected across said poly-unit means; voltage responsive means connected across said load means providing a signal; sensing and comparing means responsive to said signal for applying D.C. control power to said control windings; and capacitor means connected in series with said poly-unit reactor means.

References Cited in the file of this patent

UNITED STATES PATENTS

| | | |
|---|---|---|
| 1,834,416 | Osgood | Dec. 1, 1931 |
| 2,278,151 | Runaldue | Mar. 31, 1942 |
| 2,413,263 | Suter | Dec. 24, 1946 |
| 2,814,773 | Comins et al. | Nov. 26, 1957 |
| 2,816,263 | Sterk | Dec. 10, 1957 |
| 2,842,733 | Lilienstein | July 8, 1958 |
| 2,869,069 | Wright | Jan. 13, 1959 |
| 2,916,689 | Selin | Dec. 8, 1959 |